US010723224B2

(12) United States Patent
Misu et al.

(10) Patent No.: US 10,723,224 B2
(45) Date of Patent: Jul. 28, 2020

(54) ELECTRIC VEHICLE DRIVE UNIT

(71) Applicant: AISIN SEIKI KABUSHIKI KAISHA, Kariya-shi (JP)

(72) Inventors: Takahiro Misu, Nagoya (JP); Yuki Tojima, Chita-gun (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 64 days.

(21) Appl. No.: 16/104,193

(22) Filed: Aug. 17, 2018

(65) Prior Publication Data
US 2019/0077255 A1 Mar. 14, 2019

(30) Foreign Application Priority Data

Sep. 12, 2017 (JP) .................................. 2017-174874

(51) Int. Cl.
| | |
|---|---|
| *F16H 3/72* | (2006.01) |
| *B60K 17/08* | (2006.01) |
| *B60K 1/02* | (2006.01) |
| *B60K 17/02* | (2006.01) |
| *H02K 7/00* | (2006.01) |

(Continued)

(52) U.S. Cl.
CPC ............... *B60K 17/08* (2013.01); *B60K 1/02* (2013.01); *B60K 17/02* (2013.01); *F16H 3/727* (2013.01); *F16H 3/728* (2013.01); *H02K 7/006* (2013.01); *H02K 7/108* (2013.01); *H02K 7/116* (2013.01); *H02K 17/32* (2013.01); *H02K 17/36* (2013.01); *B60Y 2400/421* (2013.01); *B60Y 2400/73* (2013.01); *F16H 2200/0021* (2013.01); *F16H 2200/2007* (2013.01); *F16H 2200/2094* (2013.01)

(58) Field of Classification Search
CPC .................................. B60K 1/02; F16H 3/727
See application file for complete search history.

(56) References Cited

U.S. PATENT DOCUMENTS

| | | | | |
|---|---|---|---|---|
| 6,953,409 | B2 * | 10/2005 | Schmidt .................. | B60K 6/387 475/5 |
| 7,315,774 | B2 * | 1/2008 | Morris ..................... | B60K 1/02 701/53 |

(Continued)

FOREIGN PATENT DOCUMENTS

| | | |
|---|---|---|
| JP | 2016-107735 | 6/2016 |
| JP | 6153918 | 6/2017 |
| JP | 6208345 | 10/2017 |

*Primary Examiner* — Sherry L Estremsky
(74) *Attorney, Agent, or Firm* — Oblon, McClelland, Maier & Neustadt, L.L.P.

(57) ABSTRACT

An electric vehicle drive unit includes: first and second traveling motors that include first and second rotors, respectively; and a first planetary gear mechanism that includes first to third rotation element, The first rotation element is rotatably coupled to the first rotor. The second rotation element is rotatably coupled to the second rotor via a connection portion. The third rotation element is coupled to an output shaft coupled to a drive wheel side. Rotary axes in the first planetary gear mechanism, the first traveling motor and the second traveling motor are coaxially arranged. The electric vehicle drive unit further includes a clutch that disconnectably connects any two rotation elements among the first to third rotation elements to switch the two rotation elements to a directly coupled state at the time of connection.

9 Claims, 2 Drawing Sheets

(51) Int. Cl.
*H02K 7/116* (2006.01)
*H02K 17/32* (2006.01)
*H02K 17/36* (2006.01)
*H02K 7/108* (2006.01)

(56) References Cited

U.S. PATENT DOCUMENTS

| | | | | |
|---|---|---|---|---|
| 7,568,990 | B2* | 8/2009 | Sah | B60K 6/365 |
| | | | | 475/117 |
| 7,988,579 | B2* | 8/2011 | Tabata | B60L 50/16 |
| | | | | 475/5 |
| 8,224,544 | B2* | 7/2012 | Sah | B60W 20/10 |
| | | | | 701/68 |
| 9,463,785 | B2* | 10/2016 | Shiratori | B60W 10/08 |
| 9,771,059 | B2* | 9/2017 | Lindstrom | B60K 1/02 |
| 10,239,513 | B2* | 3/2019 | Lindstrom | B60W 30/19 |
| 10,400,862 | B2* | 9/2019 | Lindstrom | B60K 6/365 |
| 2012/0035014 | A1* | 2/2012 | Moeller | B60K 6/445 |
| | | | | 475/5 |
| 2018/0320783 | A1* | 11/2018 | Lindstrom | B60W 10/11 |
| 2019/0283564 | A1* | 9/2019 | Kaltenbach | B60K 6/365 |

\* cited by examiner

FIG.2

| TRAVELING STATE | CL | MG1 | MG2 | PG1 |
|---|---|---|---|---|
| LOW SPEED AND HIGH LOAD (TRAVELING UPHILL) | OFF (DISCONNECT) | REGENERATE OR STOP AND APPLY LOAD | POWERED | SPEED OF MG2 IS REDUCED DUE TO REACTION FORCE OF MG1 |
| LOW TO MEDIUM SPEED AND HIGH LOAD (ACCELERATION REQUIRED) | OFF (DISCONNECT) | POWERED | POWERED | BALANCED OPERATIONS OF MG1 AND MG2 |
| MEDIUM TO HIGH SPEED AND HIGH LOAD (ACCELERATION REQUIRED) | ON (CONNECT) | POWERED | POWERED | DIRECTLY COUPLED STATE |
| MEDIUM TO HIGH SPEED AND LOW LOAD (CRUISE TRAVELING) | ON (CONNECT) | POWERED | FREE | DIRECTLY COUPLED STATE |
| LOW TO MEDIUM SPEED AND LOW LOAD | ON (CONNECT) | POWERED | FREE | DIRECTLY COUPLED STATE |
| INERTIAL (COASTING) TRAVELING | OFF (DISCONNECT) | STOP LOAD | FREE | NEUTRAL STATE |

ELECTRIC VEHICLE DRIVE UNIT

CROSS REFERENCE TO RELATED APPLICATIONS

This application is based on and claims priority under 35 U.S.C. § 119 to Japanese Patent Application 2017-174874, filed on Sep. 12, 2017, the entire contents of which are incorporated herein by reference.

TECHNICAL FIELD

This disclosure relates to an electric vehicle drive unit. The electric vehicle in this disclosure means a vehicle equipped with a traveling motor to which electric power is supplied from a battery and rotates drive wheels. The electric vehicle includes a vehicle equipped with an engine in addition to the traveling motor (so-called a hybrid vehicle), which is in a state of not using the engine, and the traveling motor includes a motor generator that functions as a motor that receives electric power from the battery and drives the drive wheels and functions as a generator that generates electric power by rotation of the drive wheels and supplies the electric power to the battery during deceleration or the like.

BACKGROUND DISCUSSION

In JP-2016-107735, a hybrid vehicle that rotates drive wheels using an engine and a traveling motor has been disclosed. An electric vehicle drive unit in this hybrid vehicle includes a first traveling motor and a second traveling motor, a first brake that restrains the rotation of the first traveling motor, a second brake that restrains the rotation of the second traveling motor, and a planetary gear mechanism provided with a ring gear, a sun gear, and a carrier. The electric vehicle drive unit has a driving mode in which each of the rotary axes in the planetary gear mechanism, the first traveling motor and the second traveling motor is coaxially arranged, the ring gear is coupled to the first rotor which is the rotor of the first traveling motor, the sun gear is coupled to the second rotor which is the rotor of the second traveling motor, and the carrier is coupled to the drive wheels sides, and then, the first traveling motor and the second traveling motor are powered, and thus, the vehicle travels using the driving forces of both the first traveling motor and the second traveling motor.

However, in the electric vehicle drive unit in JP-2016-107735 described above, in the driving mode in which the driving force of both the first traveling motor and the second traveling motor is added to the planetary gear mechanism for the traveling, it is necessary to balance the powering of the first traveling motor and the second traveling motor by supplying the electric power to the first traveling motor and the second traveling motor while turning OFF the first brake and the second brake. In order to secure the balance between the powering of the first traveling motor and the powering of the second traveling motor, the output necessary for powering both the first traveling motor and the second traveling motor are required.

Thus, a need exists for an electric vehicle drive unit which is not susceptible to the drawback mentioned above.

SUMMARY

An electric vehicle drive unit according to an aspect of this disclosure includes: a first traveling motor that includes a first rotor; a second traveling motor that includes a second rotor; and a first planetary gear mechanism that includes a first rotation element, a second rotation element, and a third rotation element. The first rotation element is rotatably coupled to the first rotor. The second rotation element is rotatably coupled to the second rotor via a connection portion. The third rotation element is coupled to an output shaft coupled to a drive wheel side. Rotary axes in the first planetary gear mechanism, the first traveling motor and the second traveling motor are coaxially arranged. The electric vehicle drive unit further includes a clutch that disconnectably connects any two rotation elements among the first rotation element, the second rotation element and the third rotation element to switch the two rotation elements to a directly coupled state at the time of connection.

According to the configuration, in the electric vehicle drive unit, the clutch switches a state of the first planetary gear mechanism to the directly coupled state, and in this case, the electric vehicle can travel by adding the powered driving force of the first motor generator and the second motor generator to the first planetary gear mechanism without balancing the powering of the first motor generator and the second motor generator. In this way, since the driving force of the first traveling motor and the second traveling motor can be added for the vehicle to travel, two traveling motors of the first traveling motor and the second traveling motor having different characteristics can be used, and thus, it is possible to improve the traveling performance of the electric vehicle while utilizing the characteristics of the individual traveling motors.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a diagram illustrating an example of a traveling state of an electric vehicle and an operation of the electric vehicle drive unit.

DETAILED DESCRIPTION

Figure 1:
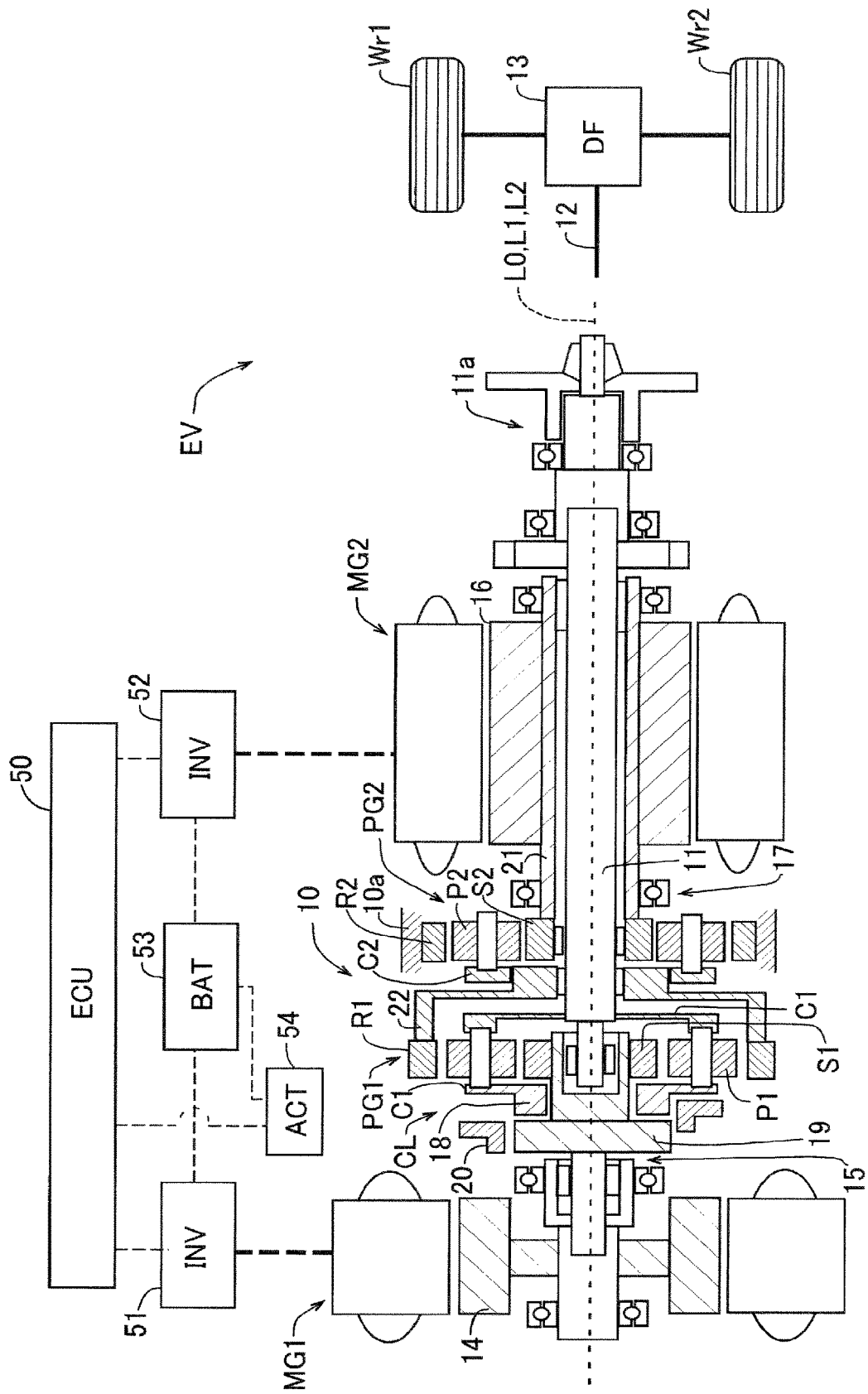
FIG. 1 is a schematic diagram conceptually illustrating an electric vehicle drive unit in an embodiment of the disclosure.

Hereinafter, an embodiment of the disclosure will be described with reference to the drawings. An electric vehicle EV illustrated in FIG. 1 is equipped with an electric vehicle drive unit 10 that gives driving force to drive wheels (rear wheels) Wr1 and Wr2. The electric vehicle drive unit 10 includes a first motor generator MG1, a second motor generator MG2, a first planetary gear mechanism PG1, and a clutch CL. A drive shaft 11 is coupled to the first planetary gear mechanism PG1. The drive shaft 11 is coupled to a propeller shaft 12 via a connection portion 11a and the drive shaft 11 is coupled to the drive wheels Wr1 and Wr2 via a differential gear 13. The first motor generator MG1 and the second motor generator MG2 are coupled to the first planetary gear mechanism PG1. The clutch CL switches the first planetary gear mechanism PG1 to a direct connection state. The electric vehicle drive unit 10 is controlled by a control device 50.

Next, each portion such as the first planetary gear mechanism PG1, the first motor generator MG1, the second motor generator MG2, the control device 50, and the like will be described.

First Planetary Gear Mechanism

As illustrated in FIG. 1, the first planetary gear mechanism PG1 is a single pinion type planetary gear mechanism, and includes a first sun gear S1 of an external gear, a first ring gear R1 of an internal gear arranged on a concentric circle with the first sun gear S1, a plurality of first pinion gears P1 engaged with the first sun gear S1 and engaged with the first ring gear R1, and a first carrier C1 rotatably holding the plurality of first pinion gears P1. The rotary axis of the first planetary gear mechanism PG1 is indicated as a rotary axis L0.

In the first planetary gear mechanism PG1, the first sun gear S1 is rotatably coupled to the first rotor (rotor) 14 of the first motor generator MG1 via a connecting axis 15, and the first ring gear R1 is rotatably coupled to the second rotor (rotor) 16 of the second motor generator MG2 via a connection portion 17. The drive shaft 11 is coupled to the first carrier C1. The first sun gear S1 corresponds to a "first rotation element" in the disclosure, the first ring gear R1 corresponds to a "second rotation element" in the disclosure, and the first carrier C1 corresponds to a "third rotation element" in the disclosure. The drive shaft 11 corresponds to an "output shaft" in the disclosure.

First Motor Generator

The first motor generator MG1 can be driven as an electric motor and can be driven as a generator, and is preferably a low torque high speed motor having characteristics in which a torque is low and a maximum rotation speed is high. The first motor generator MG1 is preferably a synchronous motor in which a permanent magnet is incorporated. As illustrated in FIG. 1, in the first motor generator MG1, the rotary axis L1 of the first motor generator MG1 is arranged coaxially with the rotary axis L0 of the first planetary gear mechanism PG1 described above. In the first motor generator MG1, the output and the gear ratio are set such that the electric vehicle EV can travel at the maximum speed when the first planetary gear mechanism PG1 is in a state of being directly coupled to the clutch CL. The first motor generator MG1 corresponds to a "first traveling motor" in the disclosure.

Second Motor Generator

The second motor generator MG2 can be driven as an electric motor and can be driven as a generator, and is preferably a high torque low speed motor having characteristics in which a torque is high and a maximum rotation speed is low compared to those of the first motor generator MG1. The second motor generator MG2 is preferably an induction motor in which a permanent magnet is not incorporated. As illustrated in FIG. 1, the rotary axis of the second motor generator MG2 is arranged coaxially with the rotary axis L0 of the first planetary gear mechanism PG1 and the first motor generator MG1. The second motor generator MG2 corresponds to a "second traveling motor" in the disclosure.

Clutch

The clutch CL disconnectably connects any two of the rotation elements among the first sun gear S1, the first ring gear R1, and the first carrier C1 which are the rotation elements of the first planetary gear mechanism PG1, and then, switches the state of two rotation elements, that is, the first planetary gear mechanism PG1, to the directly coupled state at the time of connection. The clutch CL switches the state of two rotation elements, that is, the planetary gear mechanism PG, to a neutral state when clutch CL is dis. An example in which the clutch CL switches the state of the first planetary gear mechanism PG1 to the directly coupled state by connecting the first sun gear S1 and the first carrier C1 is illustrated in FIG. 1.

As illustrated in FIG. 1, the clutch CL is a generally known dog clutch that includes, for example, a clutch ring 18 having dog clutch teeth and rotatably provided integrally with the first carrier C1, a clutch hub 19 fixed to the connecting axis 15 adjacent to the clutch ring 18, and a sleeve 20 that is moveably engaged with the clutch hub 19 along the direction of the rotary axis L0 and can be engaged to the dog clutch teeth of the clutch ring 18. The clutch CL is not limited to the dog clutch, and other clutch is also applicable, the dog clutch does not need a synchronizing mechanism and high operation force (for example, a hydraulic circuit) to operate the synchronizing mechanism, and thus, the structure can be simplified.

Speed Reduction Mechanism

A second planetary gear mechanism PG2 is provided in the connection portion 17 as a speed reduction mechanism. For example, as illustrated in FIG. 1, the second planetary gear mechanism PG2 is a single pinion type planetary gear mechanism, and includes a second sun gear S2 of an external gear, a second ring gear R2 of an internal gear arranged on a concentric circle with the second sun gear S2, a plurality of second pinion gears P2 engaged with the second sun gear S2 and engaged with the second ring gear R2, and a second carrier C2 rotatably holding the plurality of second pinion gears P2. As illustrated in FIG. 1, the rotary axis L2 of the second planetary gear mechanism PG2 is arranged coaxially with the rotary axes L0 and L1 of the first planetary gear mechanism PG1, the first motor generator MG1, and the second motor generator MG2.

As illustrated in FIG. 1, the second sun gear S2 is integrally rotatably coupled to the second rotor 16 of the second motor generator MG2 at the connecting axis 21. The connecting axis 21 is hollow and, on the inner circumference of the connecting axis 21, a drive shaft 11 is provided rotatably relative to the connecting axis 21. The second ring gear R2 is fixed to a casing 10a of the electric vehicle drive unit 10. The second carrier C2 is integrally rotatably coupled to the first ring gear R1 of the first planetary gear mechanism PG1 at a connecting axis 22. The rotation of the second rotor 16 of the second motor generator MG2 is reduced by the speed reduction mechanism, that is, the second planetary gear mechanism PG2, and transferred to the first ring gear R1 of the first planetary gear mechanism PG1.

In the configuration described above, the first ring gear R1 is coupled to the second carrier C2 such that the second ring gear R2 cannot rotate, and the rotation of the second rotor 16 is transferred to the first ring gear R1 from the second sun gear S2 via the second carrier C2. In addition, the rotation of the first rotor R1 is transferred to the first sun gear S1, and transferred to the output shaft 11 via the clutch CL and via the first carrier C1.

Furthermore, the rotation of the first ring gear R1 is transferred to the output shaft 11 via the clutch CL and the first carrier C1.

In this way, by configuring the first planetary gear mechanism PG1 rotatably coupled to the two motor generators MG1 and MG2, the power (torque) of any one or both of the first motor generator MG1 and the second motor generator MG2 can be input and output to the drive wheels Wr1 and Wr2 via the drive shaft 11, the propeller shaft 12, and the differential gear 13.

Control Device 50

As illustrated in FIG. 1, the first motor generator MG1 and the second motor generator MG2 exchange the electric power with a battery (power storage device) 53 via a first inverter 51 and a second inverter 52, respectively. Driving of both the first motor generator MG1 and the second motor generator MG2 are controlled by the control device 50. A switching control signal is output from the control device 50 to the first inverter 51 and the second inverter 52, and the first inverter 51 and the second inverter 52 control the driving of the first motor generator MG1 and the second motor generator MG2 according to the switching control signal. The control device 50 controls the driving of the clutch actuator 54 for moving the sleeve 20 along the rotary axis L0 described above in order to switch over the clutch CL described above.

Next, an example of the operation of the electric vehicle drive unit 10 controlled by the control device 50 with respect to the traveling state of the electric vehicle EV is illustrated in FIG. 2.

Low Speed and High Load

In a traveling state where the electric vehicle EV is at a low speed and high load such as when traveling uphill, the control device 50 performs the control to turn OFF, that is, disconnect the clutch CL, to cause the first motor generator MG1 to regenerate or to stop and apply a load to the first motor generator MG1, and then, to cause the second motor generator MG2 to be powered. In this way, in the electric vehicle drive unit 10, since the load is applied to the first sun gear S1 of the first planetary gear mechanism PG1 coupled to the first motor generator MG1, that is, due to the reaction force of the first motor generator MG1, the speed of the first carrier C1 which is the output of first planetary gear mechanism PG1 is reduced. In the electric vehicle drive unit 10, the rotation speed of the second rotor 16 of the second motor generator MG2 is further reduced by the first planetary gear mechanism PG1 in addition to the speed reduction by the second planetary gear mechanism PG2. Therefore, in the traveling state of the low speed and high load in the electric vehicle EV, the second motor generator MG2 which is a high torque low speed motor is powered, the rotation speed of the second motor generator MG2 is further reduced by the first planetary gear mechanism PG1 in addition to the speed reduction by the second planetary gear mechanism PG2. Therefore, the electric vehicle drive unit 10 can output further increased high torque from the drive shaft 11, and thus, the electric vehicle EV can travel in a traveling state of low speed and high load with the power of the second motor generator MG2.

Low to Medium Speed and High Load

In a traveling state where the electric vehicle EV is at a low to medium speed and high load such as when acceleration is required, the control device 50 performs the control to turn OFF, that is, disconnect the clutch CL, and to cause the first motor generator MG1 and the second motor generator MG2 to be powered and to balance the first motor generator MG1 and the second motor generator MG2 so as to operate in balance. In this way, by balancing the powering of both the first motor generator MG1 which is a low torque high speed motor and the second motor generator MG2 which is a high torque low speed motor, the electric vehicle EV can travel in a traveling state of low to medium speed and high load.

Medium to High Speed and High Load

In a traveling state where the electric vehicle EV is at a medium to high speed and high load such as when, acceleration is required, for example, when margin driving force is required for overtaking acceleration and the like, the control device 50 performs control to turn ON, that is, connect clutch CL, to make the first planetary gear mechanism PG1 be in the directly coupled state, and to cause the first motor generator MG1 and the second motor generator MG2 to be powered. In this way, since the first planetary gear mechanism PG1 is switched to a directly coupled state by the clutch CL, the electric vehicle EV can travel by adding the powered driving force of the first motor generator MG1 and the second motor generator MG2 to the first planetary gear mechanism PG1 without balancing the powering of the first motor generator MG1 and the second motor generator MG2. Therefore, since the electric vehicle EV can travel in a state of adding the driving force of the first motor generator MG1 which is a low torque high speed motor and the second motor generator MG2 which is a high torque low speed motor, it is possible to travel in a state of medium to high speed and high load.

Medium to High Speed and Low Load

In a traveling state where the electric vehicle EV is at a medium to high speed and low load such as cruise traveling, the control device 50 performs the control to turn ON, that is, connect the clutch CL, to make the first planetary gear mechanism PG1 be in a directly coupled state, to cause the first motor generator MG1 to be powered, and to make the second motor generator MG2 be free (co-rotation). In this way, the first planetary gear mechanism PG1 is switched to a directly coupled state at the clutch CL, the electric vehicle EV can travel in a traveling state of medium to high speed and low load with the power of the first motor generator MG1 which is a low torque high speed motor. In addition, the second motor generator MG2 is free (co-rotation), but since the second motor generator MG2 is an induction motor, since the permanent magnet is not incorporated, no back electromotive force is generated, and thus, the energy loss can be reduced.

Low to Medium Speed and Low Load

In a traveling state where the electric vehicle EV is at a low to medium speed and low load, similar to the traveling state of medium to high speed and low load, the control device 50 performs the control to turn ON, that is, connect the clutch CL, to make the first planetary gear mechanism PG1 be in the directly coupled state, performs powering on the first motor generator MG1, and to make the second motor generator MG2 be free (co-rotation). In this way, the first planetary gear mechanism PG1 is switched to a directly coupled state at the clutch CL, the electric vehicle EV can travel in a traveling state of low to medium speed low load with the power of the first motor generator MG1 which is a low torque high speed motor. In addition, the second motor generator MG2 is free (co-rotation), but since the second motor generator MG2 is an induction motor, the permanent magnet is not incorporated, no back electromotive force is generated, and thus, the energy loss can be reduced.

Inertial (Coasting) Traveling

In a traveling state where the electric vehicle EV performs inertia (coasting) traveling, the control device 50 performs the control to turn OFF, that is, disconnect the clutch CL, to make the first planetary gear mechanism PG1 be in the neutral state, stops the load of the first motor generator MG1, and to make the second motor generator MG2 be free (co-rotation). Therefore, in the first motor generator MG1 which is a synchronous motor in which a permanent magnet is incorporated, since the rotation of the first rotor 14 is stopped by the load caused by the reaction of the permanent magnet, no back electromotive force is generated, and thus, the energy loss can be reduced. In addition, the second motor generator MG2 is free (co-rotation), but since the second motor generator MG2 is an induction motor, since the permanent magnet is not incorporated, no back electromotive force is generated, and thus, the energy loss can be reduced. As a result, the electric vehicle EV can reduce the energy loss and perform the inertial (coasting) traveling without requiring clutch to disconnect the first motor generator MG1 and the second motor generator MG2 from the drive wheels Wr1 and Wr2.

In the examples described above, the examples in which the disclosure is applied to the electric vehicle EV equipped with two motor generators MG1 and MG2 is described. However, the disclosure is not limited thereto and the disclosure can also be applied to the electric vehicle equipped with equal to or more than three motor generators.

In the examples described above, the case where the first planetary gear mechanism PG1 is the single pinion type planetary gear mechanism is described. However, the first planetary gear mechanism PG1 is not limited thereto, and instead of the single pinion type planetary gear mechanism, a double pinion type planetary gear mechanism can be used, which includes the first carrier C1 that rotatably holds a plurality of sets of two first pinion gears P1 that are engaged with each other and one of which is engaged with the first sun gear S1 and the other of which is engaged with the first ring gear R1. When the first planetary gear mechanism PG1 is the double pinion type planetary gear mechanism, the first sun gear S1 corresponds to the "first rotation element" in the disclosure, the first ring gear R1 corresponds to the "third rotation element" in the disclosure, and the first carrier C1 corresponds to the "second rotation element" in the disclosure.

Effects of the Embodiment

As described above, the electric vehicle drive unit 10 in the embodiment of the disclosure includes: the first traveling motor MG1 that includes the first rotor 14; the second traveling motor MG2 that includes the second rotor 16; and the first planetary gear mechanism PG1 that includes the first rotation element S1, the second rotation element R1, and the third rotation element C1. In the electric vehicle drive unit 10, the first rotation element S1 is rotatably coupled to the first rotor 14, the second rotation element R1 is rotatably coupled to the second rotor 16 via the connection portion 17, the third rotation element C1 is coupled to an output shaft 11 coupled to the drive wheels sides Wr1 and Wr2, and the rotary axes L0, L1, and L2 in the first planetary gear mechanism PG1, the first traveling motor MG1 and the second traveling motor MG2 are each coaxially arranged. The electric vehicle drive unit 10 further includes a clutch CL that disconnectably connects any two of the rotation elements among the first rotation element S1, the second rotation element R1 and the third rotation element C1, and then, switches the states of two rotation elements to a directly coupled state at the time connection by the clutch CL. In this way, in the electric vehicle drive unit 10, the clutch CL switches state of the first planetary gear mechanism PG1 to the directly coupled state, and in this case, the electric vehicle EV can travel by adding the powered driving force of the first motor generator MG1 and the second motor generator MG2 to the first planetary gear mechanism PG1 without balancing the powering of the first motor generator MG1 and the second motor generator MG2. Therefore, in the electric vehicle drive unit 10, since the driving force of the first traveling motor MG1 and the second traveling motor MG2 can be added for the vehicle to travel, two traveling motors of the first traveling motor MG1 and the second traveling motor MG2 having different characteristics can be used, and thus, it is possible to improve the traveling performance of the electric vehicle while utilizing the characteristics of the individual traveling motors. In addition, since the rotary axes L0, L1, and L2 in the first planetary gear mechanism PG1, the first traveling motor MG1 and the second traveling motor MG2 are each coaxially arranged, the electric vehicle drive unit 10 can be installed in the vehicle without changing the power transmission line in place of the drive unit in a vehicle having a front engine/rear drive system (FR) in an internal combustion engine in the related art, and thus, an electric vehicle can easily be realized.

As described above, according to the electric vehicle drive unit 10 in the embodiment of the disclosure, the clutch CL is a dog clutch. As a result, the dog clutch does not require a synchronization mechanism nor the high operation force (such as a hydraulic circuit) to operate the synchronization mechanism, and thus, the structure can be simplified.

As described above, according to the electric vehicle drive unit 10 in the embodiment of the disclosure, the second traveling motor MG2 is a high torque low speed motor having characteristics of high torque and a low maximum rotation speed compared to the first traveling motor MG1. As a result, when the vehicle travels at high load and the high torque is required to be generated, since the high torque can be generated by utilizing the characteristics of the high torque low speed motor, it is possible to improve the traveling performance of the electric vehicle. Therefore, for example, in a case where the movable load is significantly different between an empty vehicles and loaded vehicles such as truck, bus, and the like, the electric vehicle travels by driving the high torque low speed motor which is the second traveling motor MG2 when the electric vehicle is highly loaded and travels at the high load, and travels by driving the first traveling motor MG1 when the electric vehicle is empty, and thus, it is possible to reduce the energy consumption.

As described above, according to the electric vehicle drive unit 10 in the embodiment of the disclosure, the speed reduction mechanism PG2 is provided on the connection portion 17, that is, the speed reduction mechanism PG2 is provided on the connection portion 17 connecting the second rotation element R1 of the first planetary gear mechanism PG1 and the second rotor 16 of the second traveling motor MG2 which is a high torque low speed motor. As a result, in the second rotation element R1 of the first planetary gear mechanism PG1, the rotation speed of the high torque low speed motor is reduced by the speed reduction mechanism PG2, and the driving force thereof can be higher torque. Therefore, the second traveling motor MG2 can be downsized.

As described above, according to the electric vehicle drive unit 10 in the embodiment of the disclosure, the second traveling motor MG2 is an induction motor. As a result, if the electric vehicle is traveling due to the powering of the first traveling motor MG1 or if the electric vehicle is performing the inertial (coasting) traveling, the second traveling motor MG2 is in a free rotation state and does not have the permanent magnet due to being an induction motor, and thus, no back electromotive force is generated, and the energy loss can be reduced.

As described above, according to the electric vehicle drive unit 10 in the embodiment of the disclosure, the speed reduction mechanism is a second planetary gear mechanism PG2, and the rotary axis L2 of the second planetary gear mechanism PG2 is arranged coaxially with the rotary axes L0 and L1 of the first planetary gear mechanism, the first traveling motor, and the second traveling motor. As a result, the electric vehicle drive unit 10 can be installed in the vehicle without changing the power transmission line in place of the drive unit in a vehicle having a front engine/rear drive system (FR) in an internal combustion engine in the related art, and thus, an electric vehicle can easily be realized.

As described above, according to the electric vehicle drive unit 10 in the embodiment of the disclosure, the first planetary gear mechanism PG1 is a single pinion type. The first rotation element is the first sun gear S1. The second rotation element is the first ring gear R1. The third rotation element is the first carrier C1. The clutch CL connects the first sun gear S1 and the first carrier C1. As a result, the electric vehicle drive unit 10 can easily be mounted on the vehicle with a simple structure.

In addition, it is possible to achieve the effects described above using the configuration in which the first ring gear R1 is coupled to the second carrier C2 such that the second ring gear C2 cannot rotate, and the rotation of the second rotor 16 is transferred to the first ring gear R1 from the second sun gear S2 via the second carrier C2, the configuration in which the rotation of the first rotor 14 is transferred to the first sun gear S1, and transferred to the output shaft 11 via the clutch CL and via the first carrier, and in addition, the configuration in which the rotation of the first ring gear R1 is transferred to the output shaft 11 via the clutch CL and the first carrier C1.

If there are a plurality of embodiments, it is apparent that the characteristic parts of each embodiment can be appropriately combined unless otherwise noted.

An electric vehicle drive unit according to an aspect of this disclosure includes: a first traveling motor that includes a first rotor; a second traveling motor that includes a second rotor; and a first planetary gear mechanism that includes a first rotation element, a second rotation element, and a third rotation element. The first rotation element is rotatably coupled to the first rotor. The second rotation element is rotatably coupled to the second rotor via a connection portion. The third rotation element is coupled to an output shaft coupled to a drive wheel side. Rotary axes in the first planetary gear mechanism, the first traveling motor and the second traveling motor are coaxially arranged. The electric vehicle drive unit further includes a clutch that disconnectably connects any two rotation elements among the first rotation element, the second rotation element and the third rotation element to switch the two rotation elements to a directly coupled state at the time of connection.

According to the configuration, in the electric vehicle drive unit, the clutch switches a state of the first planetary gear mechanism to the directly coupled state, and in this case, the electric vehicle can travel by adding the powered driving force of the first motor generator and the second motor generator to the first planetary gear mechanism without balancing the powering of the first motor generator and the second motor generator. In this way, since the driving force of the first traveling motor and the second traveling motor can be added for the vehicle to travel, two traveling motors of the first traveling motor and the second traveling motor having different characteristics can be used, and thus, it is possible to improve the traveling performance of the electric vehicle while utilizing the characteristics of the individual traveling motors.

In the electric vehicle drive unit according to the aspect of this disclosure, the clutch may be a dog clutch.

In the electric vehicle drive unit according to the aspect of this disclosure, the second traveling motor may be a high torque low speed motor having characteristics of high torque and a low maximum rotation speed compared to the first traveling motor.

In the electric vehicle drive unit according to the aspect of this disclosure, a speed reduction mechanism may be provided on the connection portion.

In the electric vehicle drive unit according to the aspect of this disclosure, the second traveling motor may be an induction motor.

In the electric vehicle drive unit according to the aspect of this disclosure, the speed reduction mechanism may be a second planetary gear mechanism, and a rotary axis of the second planetary gear mechanism may be arranged coaxially with the rotary axes of the first planetary gear mechanism, the first traveling motor, and the second traveling motor.

In the electric vehicle drive unit according to the aspect of this disclosure, the first planetary gear mechanism may be a single pinion type, the first rotation element is a first sun gear, the second rotation element may be a first ring gear, the third rotation element may be a first carrier, and the clutch may connect the first sun gear and the first carrier.

In the electric vehicle drive unit according to the aspect of this disclosure, the second planetary gear mechanism may be a single pinion type and include a second sun gear, a second ring gear, and a second carrier, and the first ring gear may be coupled to the second carrier such that the second ring gear is not capable of rotating, and rotation of the second rotor is transferred to the first ring gear from the second sun gear via the second carrier.

In the electric vehicle drive unit according to the aspect of this disclosure, rotation of the first rotor may be transferred to the first sun gear, and transferred to the output shaft via the clutch and via the first carrier.

In the electric vehicle drive unit according to the aspect of this disclosure, rotation of the first ring gear may be transferred to the output shaft via the clutch and the first carrier.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electric vehicle drive unit comprising:
 a first traveling motor that includes a first rotor;
 a second traveling motor that includes a second rotor; and
 a first planetary gear mechanism that includes a first rotation element, a second rotation element, and a third rotation element, wherein
 the first rotation element is rotatably coupled to the first rotor,
 the second rotation element is rotatably coupled to the second rotor via a connection portion,
 the third rotation element is coupled to an output shaft coupled to a drive wheel side,
 rotary axes in the first planetary gear mechanism, the first traveling motor and the second traveling motor are coaxially arranged,
 the electric vehicle drive unit further comprises a clutch that disconnectably connects any two rotation elements among the first rotation element, the second rotation element and the third rotation element to switch the two rotation elements to a directly coupled state at the time of connection, and the clutch is a dog clutch.

2. An electric vehicle drive unit comprising:

a first traveling motor that includes a first rotor;

a second traveling motor that includes a second rotor; and a first planetary gear mechanism that includes a first rotation element, a second rotation element, and a third rotation element, wherein the first rotation element is rotatably coupled to the first rotor, the second rotation element is rotatably coupled to the second rotor via a connection portion, the third rotation element is coupled to an output shaft coupled to a drive wheel side, rotary axes in the first planetary gear mechanism, the first traveling motor and the second traveling motor are coaxially arranged, the electric vehicle drive unit further comprises a clutch that disconnectably connects any two rotation elements among the first rotation element, the second rotation element and the third rotation element to switch the two rotation elements to a directly coupled state at the time of connection, and the second traveling motor is a high torque low speed motor having characteristics of high torque and a low maximum rotation speed compared to the first traveling motor.

3. The electric vehicle drive unit according to claim 2, wherein a speed reduction mechanism is provided on the connection portion.

4. The electric vehicle drive unit according to claim 3, wherein the speed reduction mechanism is a second planetary gear mechanism, and a rotary axis of the second planetary gear mechanism is arranged coaxially with the rotary axes of the first planetary gear mechanism, the first traveling motor, and the second traveling motor.

5. The electric vehicle drive unit according to claim 2, wherein the second traveling motor is an induction motor.

6. An electric vehicle drive unit comprising:

a first traveling motor that includes a first rotor;

a second traveling motor that includes a second rotor; and a first planetary gear mechanism that includes a first rotation element, a second rotation element, and a third rotation element, wherein the first rotation element is rotatably coupled to the first rotor, the second rotation element is rotatably coupled to the second rotor via a connection portion, the third rotation element is coupled to an output shaft coupled to a drive wheel side, rotary axes in the first planetary gear mechanism, the first traveling motor and the second traveling motor are coaxially arranged, the electric vehicle drive unit further comprises a clutch that disconnectably connects any two rotation elements among the first rotation element, the second rotation element and the third rotation element to switch the two rotation elements to a directly coupled state at the time of connection, the first planetary gear mechanism is a single pinion type, the first rotation element is a first sun gear, the second rotation element is a first ring gear, the third rotation element is a first carrier, and the clutch connects the first sun gear and the first carrier.

7. The electric vehicle drive unit according to claim 6, further comprising a second planetary gear mechanism that is a single pinion type, the second planetary gear mechanism including a second sun gear, a second ring gear, and a second carrier, and the first ring gear is coupled to the second carrier such that the second ring gear is not capable of rotating, and rotation of the second rotor is transferred to the first ring gear from the second sun gear via the second carrier.

8. The electric vehicle drive unit according to claim 7, wherein rotation of the first rotor is transferred to the first sun gear, and transferred to the output shaft via the clutch and via the first carrier.

9. The electric vehicle drive unit according to claim 7, wherein rotation of the first ring gear is transferred to the output shaft via the clutch and the first carrier.

* * * * *